United States Patent [19]

Tushaus et al.

[11] Patent Number: 5,290,615

[45] Date of Patent: Mar. 1, 1994

[54] ORGANOPOLYSILOXANE-POLYUREA BLOCK COPOLYMER RELEASE AGENTS

[75] Inventors: Leonard A. Tushaus, White Bear Lake; Gary T. Widerholt, West St. Paul, both of Minn.

[73] Assignee: Minnesota Mining and Manufacturing Company, St. Paul, Minn.

[21] Appl. No.: 938,873

[22] Filed: Aug. 31, 1992

Related U.S. Application Data

[60] Division of Ser. No. 616,753, Nov. 16, 1990, Pat. No. 5,214,119, and a continuation of Ser. No. 273,977, Nov. 21, 1988, abandoned, and a continuation-in-part of Ser. No. 57,570, Jun. 15, 1987, abandoned, and a continuation-in-part of Ser. No. 876,918, Jun. 20, 1986, abandoned.

[51] Int. Cl.$^5$ .............................................. A61F 13/02
[52] U.S. Cl. ........................ 428/40; 428/425.5; 428/447; 427/387; 528/28; 528/38
[58] Field of Search .............. 428/40, 425.5; 528/28, 528/38; 477/387

[56] References Cited

U.S. PATENT DOCUMENTS

| | | | |
|---|---|---|---|
| 3,562,352 | 2/1971 | Nyilas | 250/824 |
| 3,957,724 | 5/1976 | Schurb et al. | 528/28 |
| 4,002,794 | 1/1977 | Schwarz | 528/18 |
| 4,203,883 | 5/1980 | Hangauer, Jr. | 260/29.2 |
| 4,518,758 | 5/1985 | Cavezzan et al. | 528/12 |
| 4,528,343 | 7/1985 | Kira | 528/109 |
| 4,677,182 | 6/1987 | Leir et al. | 528/109 |

FOREIGN PATENT DOCUMENTS

| | | |
|---|---|---|
| 0250248 | 12/1987 | European Pat. Off. . |
| 3621040 | 6/1986 | Fed. Rep. of Germany . |
| 1481512 | 3/1967 | France . |
| 1-126389 | 5/1986 | Japan ................. C09J 7/02 |
| 1-123815 | 5/1989 | Japan . |
| 2140444B | 11/1984 | United Kingdom ........ C08G 77/46 |

OTHER PUBLICATIONS

"Segmented Organosiloxane Copolymers. 1. Synthesis of Siloxane-urea Copolymers" and Segmented Organosiloxane Copolymers: 2. Thermal and Mechanical Properties of Siloxane-urea Copolymers, *Polymer*, vol. 25, Dec. 1984, pp. 1800-1806 and 1807-1816.

"Polydimethylsiloxane-Polyurethane Elastomers: Synthesis and Properties of Segmented Copolymers and Related Zwitterionomers", *Journal of Polymer Science: Polymer Physics Edition*, vol. 23, pp. 2319-2338, 1985.

"Tetramethylammonium 3-Aminopropyl Dimethylsilanolate-A New Catalyst for the Synthesis of High Purity, High Molecular Weight $\alpha,\omega$-bis(Aminopropyl) Polydimethylsiloxanes", *Polymer International*, vol. 24, No. 3, 1991, pp. 131-138.

Chemie Und Technologie Der Silicone, Walter Noll, 1968, p. 89.

*Primary Examiner*—Ralph H. Dean
*Attorney, Agent, or Firm*—Gary L. Griswold; Walter N. Kirn; William J. Bond

[57] ABSTRACT

Block copolymers having a repeating unit comprised of polysiloxane and urea segments are prepared by copolymerizing certain diaminopolysiloxanes with diisocyanates. The invention also provides novel diaminopolysiloxanes useful as precursors in the preparation of the block copolymers and a method of making such diaminopolysiloxanes. Pressure-sensitive adhesive compositions comprising the block copolymer are also provided as are sheet materials coated with the same.

27 Claims, No Drawings

ORGANOPOLYSILOXANE-POLYUREA BLOCK COPOLYMER RELEASE AGENTS

This application is a divisional of U.S. Ser. No. 07/616,753, filed Nov. 16, 1990; now a U.S. Pat. No. 5,214,119 a continuation of U.S. Ser. No. 07/273,977, filed Nov. 11, 1988, now abandoned; a continuation-in-part of U.S. Ser. No. 07/057,570, filed Jun. 15, 1987, now abandoned; a continuation-in-part of U.S. Ser. No. 06/876,918, filed Jun. 20, 1986, now abandoned.

FIELD OF THE INVENTION

The present invention relates to organopolysiloxane-polyurea block copolymer release coatings.

BACKGROUND OF THE INVENTION

Block copolymers of polydimethylsiloxane polymers based solely on polydimethyl-siloxane lack tensile strength. Consequently, several references suggest ways for conveniently increasing the strength of these siloxane polymer elastomers. For example, various references suggest that mechanical properties of polysiloxane polymers can be improved substantially through the preparation of block copolymers which include as a repeating unit a "soft" polysiloxane block or segment and any of a variety of other "hard" blocks or segments such as polyurethane. See, for example, (Ward) U.K. Patent GB 2 140 444B, published Jun. 5, 1985, (Cavezzan et al) U.S. Pat. No. 4,518,758, (Nyilas) U.S. Pat. No. 3,562,352, and (Kira) U.S. Pat. No. 4,528,343.

Segmented polydimethylsiloxane polyurea elastomers, with silicone segment molecular weights less than about 4,000, prepared from silicone diamines and diisocyanates are described in *Polymer*, Vol. 25, pages 1800–1816, December, 1984. This reference reveals that synthesis of higher molecular weight silicone segments could not be achieved by the disclosed method. This process also leads to significant amounts of monofunctional and non-functional silicone contaminants. These contaminants remain in the polyurea elastomers prepared from such diamines.

SUMMARY OF THE INVENTION

The present invention provides organpolysiloxane-polyurea block copolymers having excellent mechanical and elastomeric properties for use as a release coating.

The release coating organosiloxane-polyurea block copolymers of the present invention are segmented copolymers of the $(AB)_n$ type which are obtained through a condensation polymerization of a difunctional organopolysiloxane amine (which produces soft segment) with little contamination from monofunctional or nonfunctional siloxane impurities, with a diisocyanate (which produces a hard segment) and may include a difunctional chain extender such as a difunctional amine or alcohol, or a mixture thereof.

More specifically, the present invention release coatings of organopolysiloxane-polyurea block copolymers comprise a repeating unit represented by Formula I, as follows:

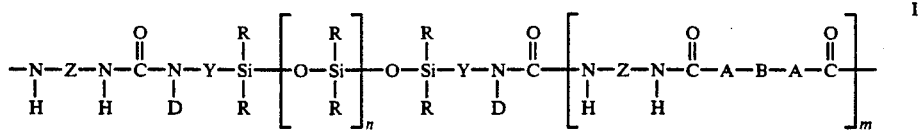

where:
- Z is a divalent radical selected from phenylene, alkylene, aralkylene and cycloalkylene;
- Y is an alkylene radical of 1 to 10 carbon atoms;
- R is at least 50% methyl with the balance of 100% of all R radical having from 2 to 12 carbon atoms, a vinylene radical, phenyl radical, or substituted phenyl radical;
- D is hydrogen, an alkyl radical of 1 to 10 carbon atoms or an alkylene radical which completes a ring structure including Y to form a heterocycle, or phenyl;
- B is a divalent radical selected from alkylene, aralkylene, cycloalkylene, phenylene, polyethylene oxide, polytetramethylene oxide, polycaprolactone, mixtures thereof, and the like;
- A is difunctional moiety selected from

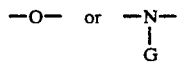

where
- G is hydrogen, an alkyl radical of 1 to 10 carbon atoms, phenyl, or an alkylene radical which completes a ring structure including B to form a heterocycle; and
- m is a number which can be zero to about 25.

In the preferred block copolymer Z is selected from the group consisting of hexamethylene, methylene bis(phenylene), isophorone, tetramethylene, cyclohexylene, and methylene dicyclohexylene and R is methyl.

A method of making the organopolysiloxane-polyurea block copolymer comprises polymerizing under reactive conditions and in an inert atmosphere:

(1) a diamine with little or no contamination from monofunctional or nonfunctional impurities having a molecular structure represented by Formula II, as follows:

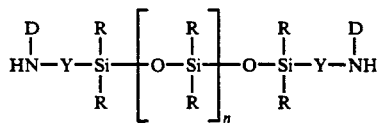

where R, Y and D are defined above;

(2) at least one diisocyanate having a molecular structure represented by Formula III, as follows:

where Z is defined above; and (3) up to 95 weight percent diamine or dihydroxy chain extender having a molecular structure represented by Formula IV, as follows:

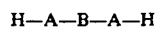

wherein A and B are defined above.

The combined molar ratio of silicone diamine, diamine and/or dihydroxy chain extender to diisocyanate in the reaction is that suitable for the formation of a block copolymer with desired properties. Preferably the ratio is maintained in the range of about 1:0.95 to 1:1.05.

The diisocyanate useful in the reaction can be a phenylene diisocyanate such as toluene diisocyanate or p-phenylene diisocyanate, hexamethylene diisocyanate, aralkylene diisocyanate such as methylene bis-(phenylisocyanate) or tetramethylxylene diisocyanate, or a cycloalkylene diisocyanate such as isophorone diisocyanate, methylene bis(cyclohexyl) diisocyanate, or cyclohexyl diisocyanate.

A method of making organopolysiloxane diamine represented by Formula II involves:

(1) combining under reaction conditions and in an inert atmosphere:
 (a) amine functional endblocker of the molecular structure represented by Formula V, as follows:

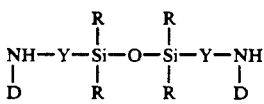

where D, R and Y are defined above;
 (b) sufficient cyclic siloxane to react with said amine functional end blocker to form a lower molecular weight organopolysiloxane diamine having a molecular weight less than about 2,000 and a molecular structure represented by Formula VI, as follows:

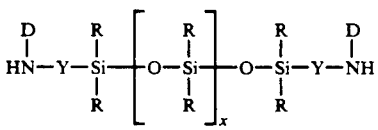

where D, R and Y are as defined above and x is a number in the range of about 4 to 40;
 (c) a catalytic amount not to exceed about 0.1% by weight based on the ultimate weight of the final organopolysiloxane diamine of a novel essentially anhydrous amine silanolate catalyst of a molecular structure represented by Formula VII, as follows

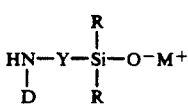

where D, Y and R are as defined above and $M^+$ is a cation such as $K^+$, $Na^+$, or $N(CH_3)_4^+$ (2) continuing the reaction until substantially all of the amine functional end blocker is consumed; and (3) adding additional cyclic siloxane until the novel organopolysiloxane diamine represented by Formula II is obtained.

The preferred amine silanolate catalyst is 3-aminopropyl dimethyl tetramethylammonium silanolate. The catalytic amount of the amine silanolate catalyst is preferably less than 0.5 weight percent, most preferably 0.005 to about 0.03 weight percent, based upon the ultimate weight of the final organopolysiloxane.

The preferred reaction conditions comprise a reaction temperature range of about 80° C. to about 90° C., a reaction time of about 5 to 7 hours, and the dropwise addition of the additional cyclic siloxane.

DETAILED DESCRIPTION

The reaction to produce the block copolymer of the invention involves mixing under reactive conditions the organopolysiloxane diamine, diamine and/or dihydroxy chain extender, if used, and diisocyanate to produce the block copolymer with hard and soft segments respectively derived from the diisocyanate and organopolysiloxane diamine. The reaction is typically carried out in a reaction solvent.

Preferred reaction solvents are those which are unreactive with the diisocyanates and which maintain the reactants and products completely in solution throughout the polymerization reaction. It has been found that chlorinated solvents, ethers, and alcohols perform best in the case of aliphatic diisocyanates with methylene chloride, tetrahydrofuran, and isopropyl alcohol being preferred. For aromatic diisocyanates such as 4,4'-methylene-bis-phenyl-isocyante (MDI), a mixture of tetrahydrofuran with 10% to 25% by weight of dipolar aprotic solvent such as dimethyl- formamide is preferred.

The starting materials and reaction solvents are usually initially purified and dried and the reaction is carried out, under an inert atmosphere such as dry nitrogen or argon.

Suitable diisocyanates include toluene diisocyanate and hexamethylene diisocyanate. Preferred diisocyanates include 4,4'-methylene-bis-phenylisocyanate (MDI), 4,4'-methylene-bis(cyclohexyl)diisocyanate (H-MDI) and isophorone diisocyanate.

As previously mentioned, a reaction to produce the organopolysiloxane diamine employs an anhydrous amine functional silanolate catalyst represented by Formula VII. The preferred catalyst in this polymerization is 3-amino-propyl dimethyl tetramethylammonium silanolate, itself a novel compound, obtained as a crystalline solid from the reaction of one molar equivalent of 1,3-bis-(3-aminopropyl)tetramethyldisiloxane with 2 molar equivalents of tetra-methylammonium hydroxide pentahydrate in tetrahydrofuran under reflux, followed by drying under vacuum for 5 hours (0.1 mm) at 60° C.

Chain extenders may be incorporated with the other reactants to provide other physical properties in the claimed block copolymer. The chain extenders may be short chain diamines such as hexamethylene diamine, xylylene diamine, 1,3-di(4-piperidyl)propane (DIPIP), N(-2-aminoethyl propylmethyldimethoxysilane (DAS), piperazine and the like, with piperidyl propane being preferred.

Polymeric diamines as well as polymeric glycols may also be copolymerized with the polysiloxane diamines, diisocyanates, and other optional non-silicone soft segments as chain extenders to impart additional desirable properties to the silicone polyureas. The resultant copolymeric segments may comprise from as little as 5% to as much as 95% of the copolymer formulation, depending on the properties of the resultant copolymer desired.

Polymeric diamines useful as nonsilicone soft segments are those which can be obtained with functionality approaching 2.0 such as polytetramethylene oxide diamine of from 5,000 to 25,000 molecular weight, with a molecular weight in the range of 8,000 to 15,000 being most preferred. Suitable polymeric diols include polytetramethylene oxide glycol, polyethylene oxide glycol, polyethylene oxide glycol, polypropylene oxide glycol, polycaprolactone glycol, and the like. In preparing the polyureas from a mixture of polysiloxane and polytetramethylene oxide diamines, the diamines are dissolved together in a suitable solvent such as methylene chloride and the diisocyanate and chain extender, if used, are introduced into the mixture, preferably at a combined amine to diisocyanate molar ratio of 1:0.95 to 1:1.05. A two stage procedure is required to copolymerize the polymeric glycols with silicone diamines in which the glycol is first heated with the diisocyanate in an inert solvent such as toluene or tetrahydrofuran with a catalytic amount of a tin compound such as stannous octoate or dibutyl tin dilaurate for a sufficient amount of time, e.g., one half to one hour, until all of the alcohol groups have been capped with isocyanate. In the second stage, the polysiloxane diamine is added followed by any optional diamine chain extenders to provide the polyether or polyester polyurethane polysiloxane polyurea block copolymer, with the combined molar ratio of amine plus alcohol to isocyanate preferably being held in the range of 1:0.95 to 1:1.05 to provide for complete reaction.

Substantially pure organopolysiloxane diamines can be produced with a preselected desired molecular weight in excess of 5,000 with excellent difunctionality. It is thought such organopolysiloxane diamines are produced with such high purity because of the presence of the following key process conditions during the preparation:

1. utilize an anhydrous amino alkyl functional silanolate catalyst such as tetramethylammonium 3-aminopropyldimethyl silanolate;
2. use a minimum amount of this catalyst, preferably less than 0.05% by weight based upon the weight of the silicone diamine being prepared; and
3. run the reaction in two stages, as herein described.

In the first stage of the reaction, a low molecular weight silicone diamine having a structure as defined by Formula VI is prepared by reacting an amine functional disiloxane endblocker of the type represented by Formula V with a cyclic siloxane in the presence of a catalytic amount of anhydrous amine functional silanolate represented by Formula VII in an inert atmosphere such as nitrogen or argon. The amount of catalyst employed should be less than 0.05 weight percent, preferably 0.005 to about 0.03 weight percent, by weight of the resultant diamino silicone. While not wanting to be bound by theory, it is thought that, by using a minimum amount of an anhydrous amine functional silanolate catalyst, the number of inactive chain ends that are produced by catalyst molecules and spurious water are held to a minimum.

The reaction is typically carried out in bulk at a temperature of 80°-90° C., and under these conditions is usually complete in about 0.5-2 hours, as judged by substantially complete disappearance of the endblocker in the reaction mixture as determined by vapor phase chromatography. An intermediate organopolysiloxane diamine is obtained having a molecular weight of less than about 2,000 and a molecular structure represented by Formula VI.

The second stage of the reaction involves the slow addition of the remainder of the cyclic siloxane required to achieve the desired molecular weight, preferably dropwise addition, at such a rate that the cyclic siloxane is incorporated into the polymer about as fast as it is added, usually in about 5 to 7 hours at the reaction temperature of 80°-90° C. The desired organopolysiloxane diamine is produced having a structure as defined by Formula II. By utilizing this two-stage method with a minimum amount of amine functional anhydrous silanolate catalyst, silicone diamines of Formula II may be consistently prepared in any desired molecular weight to about 70,000 having excellent difunctionality with little contamination from monofunctional and nonfunctional polysiloxane impurities.

It has been discovered that these copolymers are suitable for use as release coatings for a variety of pressure-sensitive adhesives. They have a high degree of difunctionality with little contamination from monofunctional or nonfunctional siloxane impurities, virtually eliminating problems such as re-adhesion. They have good stability in solution, are film-forming, and have unusually high strength plus desirable mechanical and elastomeric properties. In addition, they do not require high temperature curing or long processing times, a decided advantage in pressure-sensitive tape manufacturing.

The segmented copolymers may be prepared with a wide range of useful properties through variations in the ratio of soft segments to hard segments, the amount and nature of the chain extenders employed, and the molecular weight of the polysiloxane segment. These variations give rise to varying amounts of release, i.e., from 10 g/cm or less, to about 350 g/cm. Certain copolymers are especially useful as low-adhesion backsizes (LABs) for removable pressure-sensitive adhesives such as masking tapes. LABs for tapes in roll form ideally exhibit release toward the adhesive of about 60 to 350 g/cm width. The preferred hard segment content for copolymers used as release agents and LABs is from about 15% to about 70%. Preferred ranges vary, depending on the type of adhesive and its ultimate use, i.e., the preferred range for LABs used in masking tapes is from about 25% to about 60%. Copolymers having this range exhibit the necessary combination of adequate unwind on fresh tape and moderate unwind after adverse aging conditions of heat and humidity, plus acceptable paint masking performance, paint flaking resistance and the ability to hold when used in overtaping applications.

This invention is further illustrated by the following examples which are not intended to be limiting in scope.

EXAMPLE 1

Preparation of the Catalyst

A 100 ml three-necked round bottom flask equipped with magnetic stirrer, argon inlet and condenser fitted with a drying tube was charged with 12.4 g (0.05 mole) of 1,3-bis(3-aminopropyl)tetramethyldisiloxane, 18.1 g tetramethyl-ammonium hydroxide pentahydrate and 30 ml of tetrahydro-furan. The mixture was stirred and heated under reflux in an argon atmosphere for 1½ hours until a vapor phase chromatograph (VPC) showed complete disappearance of the disiloxane peak. Upon cooling, the mixture separated into two layers. The tetrahydrofuran was allowed to distill from the mixture until a pot temperature of 75° C. was achieved, leaving a yellow oil which was stirred and heated under vacuum (0.1 mm) in an oil bath at 60° C. until no more volatiles distilled (ca 5 hours). The crude product, a yellow waxy solid, was recrystallized from tetrahydrofuran (THF) under argon, filtered and dried under vacuum to give 3-aminopropyl dimethyl tetramethylammonium silanolate as a white crystalline solid. The chemical structure was confirmed by nuclear magnetic resonance analysis (NMR), and the product was stored at room temperature under argon.

EXAMPLE 2

Preparation of Silicone Diamine

A 500 ml three-necked round bottom flask equipped with thermometer, mechanical stirrer, dropping funnel and dry argon inlet was charged with 3.72 g bis (3-aminopropyl) tetramethyldisiloxane and 18 g of octamethylcyclotetra-siloxane ($D_4$) which had been previously purged for 10 minutes with argon. The flask contents were heated to 80° C. with an oil bath and a trace (about 0.03 to 0.05 g) of the catalyst described in Example 1 was added via a spatula. The reaction was stirred at 80° C. and after 30 minutes of stirring had become quite viscous. VPC showed that the endblocker had completely disappeared. To the resultant reaction mixture (which consisted of a 1,500 molecular weight silicone diamine, cyclic siloxanes and active catalyst) was added dropwise over a six hour period 330 g of argon-purged $D_4$ resulting in a further rise in the viscosity. Heating the reaction flask contents at 80° C. was continued overnight. The catalyst was decomposed by heating at 150° C. for ½ hour and the product was stripped at 140° at 0.1 mm pressure until no more volatiles distilled (ca. 1½ hr.), resulting in 310 g of a clear, colorless viscous oil (a yield of 88% of theoretical). The molecular weight of the product determined by acid titration was 21,200.

Using this procedure, but varying the ratio of endblocker to $D_4$ silicone diamines with molecular weights from 4,000 to as high as 70,000 were prepared.

EXAMPLE 3

Preparation of Copolymer to be used as Release Agent

| Composition: | |
|---|---|
| PDMS (MW-5560) | 25 parts by weight |
| PCL (MW-1250) | 35 parts by weight |
| DIPIP/IPDI | 40 parts by weight |

Procedure

Polycaprolactone diol (PCL)(35 g) in toluene was refluxed under nitrogen for 30 minutes with the entire charge IPDI (24.06 g) in the presence of a catalytic amount (3 drops) of dibutyl tin dilaurate. After reflux, heat was removed and toluene was added to dilute the entire mass to 500 ml. After cooling to room temperature, the polydimethyl siloxane (PDMS) diamine (25.0 g) along with 100 ml toluene was added and stirred for 15 minutes.

Then 1,3-dipiperidyl propane DIPIP (15.49 g), dissolved in 100 ml isopropanol, was added slowly over a period 2-3 minutes and stirred for 30 minutes. An increase in viscosity was observed within 5 minutes. The entire solution remained clear and colorless throughout the procedure. A final diution with toluene brought the solids level to approximately 10% in the solvent blend of 90:10 ratio of toluene:isopropanol.

A urethane saturated smooth crepe paper backing was primed with a chloroprene latex, Neoprene TM (N-115) made by DuPont, in one trip. In a second trip, the LAB was applied from a metering roll to the opposite side of the backing using a 5.0% solid solution in toluene/isopropanol. Finally, in a third trip, to the primer side was applied a latex adhesive (43% natural rubber/57% Piccolyte TM S-65, a poly β-pinene tackifying resin with a ring and ball softening point of 65° C. made by Hercules Co.), of coating weight of 4.5 $mg/cm^2$.

EXAMPLE 4

| Composition: | |
|---|---|
| polydimethyl-diphenyl siloxane (PDMDPS) (MW 2680) | 25% (contains 10 mole % diphenylsiloxane) |
| PCL (MW 1250) | 35% |
| DIPIP/IPDI | 40% |

This was prepared and coated similar to procedure used in Example 3.

EXAMPLE 5

| Composition: | |
|---|---|
| PDMS (MW 5590) | 10% |
| PCL (MW 1240) | 60% |
| DIPIP/IPDI | 15% |
| DAS/IPDI | 15% |

This was coated similar to the procedure used in Example 3.

EXAMPLE 6

| Composition: | |
|---|---|
| PDMS (MW 4900) | 23% |
| PCL (MW 1250) | 42% |
| DIPIP/IPDI | 35% |

This was coated similar to the procedure used in Example 3.

EXAMPLE 7

| Composition: | |
|---|---|
| PDMS (MW 4900) | 20% |
| PCL (MW 1250) | 20% |
| DIPIP/IPDI | 60% |

This was coated similar to the procedure of Example 3.

The test results from the above examples are tabulated in Table I.

Peel Adhesion

ASTM P3330-78 PSTC-1 (11/75)

Peel adhesion is the force required to remove a coated flexible sheet material from a test panel measured at a specific angle and rate of removal. In the examples this force is expressed in Newtons per 100 mm (N/100 mm) width of coated sheet. The procedure follows:

1. A 12.5 mm width of the coated sheet is applied to the horizontal surface of a clean glass test plate with at least 12.7 lineal cm in firm contact. A hard rubber roller is used to apply the strip.
2. The free end of the coated strip is doubled back nearly touching itself, so the angle of removal will be 180°. The free end is attached to the adhesion tester scale, and the glass test plate is moved away from the scale at a constant rate of 2.3 meters per minute.
3. The scale reading in Newtons is recorded as the tape is peeled from the glass surface. The data is recorded as the average value of the range of numbers observed during the test.

UNWIND TEST

Testing was accomplished testing at a 90° angle and 90 in/min separation.

TABLE I

| | UNWIND | | |
|---|---|---|---|
| EXAMPLE | 3 WEEKS RT | 65° C./16 HRS | 90%-50% RH |
| 3 | 17 | 21 | 21 |
| 4 | 26 | 21 | — |
| 5 | 23 | 12 | 24 |
| 6 | 22 | 12 | 20 |
| 7 | 11 | 17 | n/a |

RT = 22° C./50% RH
65° C./16 Hrs. was followed by 24 Hrs. at 22° C./50% RH
90%-50%: Tape was aged at 32° C./90% RH for 2 weeks followed by 1 week at 22° C./50% RH All examples were coated from 5% solutions on ULTRA backing using a metering roll.

| PEEL ADHESION TEST | | | |
|---|---|---|---|
| EXAMPLE | 3 WEEKS RT | 65° C./16 HRS | 90%-50% RH |
| 3 | 53 | 52 | 51 |
| 4 | 51 | 51 | — |
| 5 | 50 | 50 | 50 |
| 6 | 51 | 49 | 52 |
| 7 | 50 | 50 | — |

I claim:

1. A pressure-sensitive adhesive tape comprising a backing member having a first front side and a second back side, a layer of pressure-sensitive adhesive on said first side and a low adhesion backsize coating on said second side, said backsize coating comprising an organopolysiloxane-polyurea block copolymer comprising the condensation reaction product of an organopolysiloxane diamine reacted with at least one diisocyanate, and up to 95 weight percent of a diamine or dihydroxy chain extender wherein the organopolysiloxane has little contamination from monofunctional or nonfunctional silicone as determined by the ability of the tape to functionally adhere (PSTC-1) to a glass plate after being removed from said backsize coating.

2. The pressure-sensitive adhesive tape of claim 1 wherein the diisocyanate has the formula:

OCN—Z—NCO where:
Z is a divalent radical selected from phenylene, alkylene, aralkylene or cycloalkylene.

3. The pressure-sensitive adhesive tape of claim 1 wherein the diamine or dihydroxy chain extender has the formula:

H—A—B—A—H where:
B is a divalent radical selected from alkylene, aralkylene, cycloalkylene, phenylene, polyethylene oxide, polytetramethylene oxide, polycaprolactone, or mixtures thereof;
A is a difunctional moiety selected from

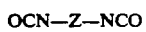

where G is hydrogen, an alkyl radical of 1 to 10 carbon atoms, phenyl, or an alkylene radical which completes a ring structure including B to form a heterocycle.

4. The pressure-sensitive adhesive tape of claim 2 wherein Z is selected from the group consisting of hexamethylene, methylene, bis-(phenylene), tetramethylene, isophorone, cyclohexylene, and methylene dicyclohexylene.

5. The pressure-sensitive adhesive tape of claim 1 wherein the organopolysiloxane diamine has a molecular weight as determined by acid titration of at least 2,000.

6. The pressure-sensitive adhesive tape of claim 1 wherein the organopolysiloxane diamine has a molecular weight as determined by acid titration of at least 4,000.

7. The pressure-sensitive adhesive tape of claim 1 wherein the organopolysiloxane diamine has the general formula:

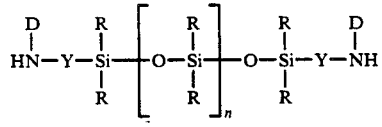

where:
R is at least 50% methyl with the balance of 100% of all R radicals being a monovalent alkyl or substituted alkyl radical having 2 to 12 carbon atoms, a vinylene radical, phenyl radical, or substituted phenyl radical group;
Y is an alkylene radical of 1 to 10 carbon atoms;
D is hydrogen, an alkyl radical of 1 to 10 carbon atoms or an alkylene radical which completes a ring structure including Y to form a heterocycl or phenyl; and
n is a number selected to provide a molecular weight as determined by acid titration of at least 2,000.

8. The pressure-sensitive adhesive tape of claim 1 wherein the copolymer comprises from about 15 to 70% hard segments.

9. The pressure-sensitive adhesive tape of claim 7 wherein R is methyl.

10. The pressure-sensitive adhesive tape of claim 1 wherein the chain extender is a diamine.

11. The pressure-sensitive adhesive tape of claim 10 wherein the diamine is polytetramethylene oxide diamine with a molecular weight as determined by acid titration of from 5,000 to 25,000 and a functionality approaching 2.

12. The pressure-sensitive adhesive tape of claim 1 wherein the organopolysiloxane diamine has a molecular weight as determined by acid titration of at least 5,000.

13. The pressure-sensitive adhesive tape of claim 1 wherein the low adhesion backsize coating is not cured.

14. A release film for a pressure-sensitive adhesive tape comprising a backing member having a first front side and a second back side, a low adhesion backsize coating on at least said first side, said backsize coating comprising a non-crosslinked organopolysiloxane-polyurea block copolymer comprising the condensation reaction product of an organopolysiloxane diamine reacted with at least one diisocyanate, and up to 95 weight percent of a diamine or dihydroxy chain extender wherein the organopolysiloxane has little contamination from monofunctional or non-functional silicone as determined by the ability of a pressure-sensitive adhesive tape to functionally adhere (PSTC-1) to a glass plate after being removed from said backsize coating.

15. The release film of claim 14 wherein the diisocyanate has the formula:

OCN—Z—NCO where:
Z is a divalent radical selected from phenylene, alkylene, aralkylene or cycloalkylene.

16. The release film of claim 14 wherein the diamine or dihydroxy chain extender has the formula:

H—A—B—A—H where:
B is a divalent radical selected from alkylene, aralkylene, cycloalkylene, phenylene, polyethylene oxide, polytetramethylene oxide, polycaprolactone, or mixtures thereof;
A is a difunctional moiety selected from

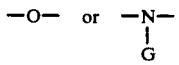

where G is hydrogen, an alkyl radical of 1 to 10 carbon atoms, phenyl, or an alkylene radical which completes a ring structure including B to form a heterocycle.

17. The release film of claim 14 wherein the organopolysiloxane diamine has a molecular weight as determined by acid titration of at least 2,000.

18. The release film of claim 14 wherein the organopolysiloxane diamine has a molecular weight as determined by acid titration of at least 4,000.

19. The release film of claim 14 wherein the organopolysiloxane diamine has the general formula:

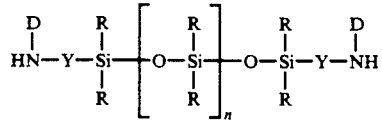

where:
R is at least 50% methyl with the balance of 100% of all R radicals being a monovalent alkyl or substituted alkyl radical having 2 to 12 carbon atoms, a vinylene radical, phenyl radical, or substituted phenyl radical group;
Y is an alkylene radical of 1 to 10 carbon atoms;
D is hydrogen, an alkyl radical of 1 to 10 carbon atoms or an alkylene radical which completes a ring structure including Y to form a heterocycle or phenyl; and
n is a number selected to provide a molecular weight as determined by acid titration of at least 2,000.

20. The release film of claim 14 wherein the copolymer comprises from about 15 to 70% hard segments.

21. The release film of claim 18 wherein R is methyl.

22. The release film of claim 14 wherein the chain extender is a diamine.

23. The release film of claim 22 wherein the diamine is polytetramethylene oxide diamine with a molecular weight as determined by acid titration of from 5,000 to 25,000 and a functionality approaching 2.

24. The release film of claim 14 wherein the organopolysiloxane diamine has a molecular weight as determined by acid titration of at least 5,000.

25. A method for forming a release coating on a backing member having a first front face and a second back face comprising the steps of;
providing a storage stable solution of a non-crosslinked organopolysiloxane-polyurea block copolymer formed by a condensation reaction of an organopolysiloxane diamine with at least one diisocyanate and up to 95weight percent of a diamine or dihydroxy chain extender with little or no residue contamination from monofunctional or non-functional silicones,
coating said storage stable solution onto the backing member, having first and second faces, on at least said first face, and
forming an elastomeric film layer release coating on said backing member of said non-crosslinked organopolysiloxane-polyurea block copolymer, without chemical crosslinking of the block copolymer, wherein the film layer is characterized by the ability of a pressure-sensitive adhesive to be removably adhered thereto such that the pressure-sensitive adhesive will functionally adhere (PSTC-1) to a glass plate after being removed from said release coating.

26. The method of claim 25 wherein the film layer is formed by evaporation of the solvent for the storage-stable solution.

27. The method of claim 26 further comprising coating said second face of said backing member with a layer of pressure-sensitive adhesive.

* * * * *

UNITED STATES PATENT AND TRADEMARK OFFICE
CERTIFICATE OF CORRECTION

PATENT NO. : 5,290,615
DATED : March 1, 1994
INVENTOR(S) : Tushaus et al.

It is certified that error appears in the above-indentified patent and that said Letters Patent is hereby corrected as shown below:

Column 8, line 12, delete "4.5 mg/cm$^2$"
and insert --4.4 mg/cm$^2$--.
Column 9, line 9, delete "rateof" and
insert --rate of--.
Claim 21, column 12, line 23, delete "18" and insert --19--.

Signed and Sealed this

Thirtieth Day of August, 1994

Attest:

BRUCE LEHMAN

*Attesting Officer*  *Commissioner of Patents and Trademarks*